United States Patent [19]

Kanou et al.

[11] Patent Number: 4,748,589
[45] Date of Patent: May 31, 1988

[54] ELECTRONIC TRANSLATOR

[75] Inventors: Ikuo Kanou, Yamatokoriyama; Shigenobu Yanagiuchi, Tenri; Takuro Omori, Yamatokoriyama, all of Japan

[73] Assignee: Sharp Kabushiki Kaisha, Osaka, Japan

[21] Appl. No.: 184,269

[22] Filed: Sep. 5, 1980

[30] Foreign Application Priority Data

Sep. 6, 1979 [JP] Japan ................... 54-114815
Sep. 13, 1979 [JP] Japan ................... 54-118147
Sep. 13, 1979 [JP] Japan ................... 54-118150

[51] Int. Cl.⁴ .............................. G06F 9/00
[52] U.S. Cl. ................................... 364/900
[58] Field of Search ........... 364/900, 200, 419, 706; 434/157, 169, 156, 335

[56] References Cited

U.S. PATENT DOCUMENTS 3,242,470  3/1966  Hagelbarger ............... 364/900
4,064,489  12/1977  Babb ........................ 364/200
4,158,236  6/1979  Levy ......................... 364/900
4,308,017  12/1981  Laughon .................. 434/335 X
4,367,537  1/1983  Yoshida ................... 364/900

FOREIGN PATENT DOCUMENTS 2014765  8/1979  United Kingdom .

Primary Examiner—Gareth D. Shaw
Assistant Examiner—John G. Mills
Attorney, Agent, or Firm—Birch, Stewart, Kolasch & Birch

[57] ABSTRACT

An electronic translator is characterized in that a control circuit is provided for providing a translation of a non-inflected form of a word upon entry of an inflected form of the word. In another preferred form of the invention, words are stored in a memory circuit in such a manner that a first memory contains address information referring to a second memory and corresponding to the first letter of each of a group of words. The second memory stores address information related to each of the second letter of the respective words. In a further preferred form of the invention, the memory comprises several memory circuits each of which stores a plurality of words belonging to a common level or rank. The plurality of words of a selected rank are displayed in turn and an operator may attempt to input words equivalent to the displayed words.

1 Claim, 8 Drawing Sheets

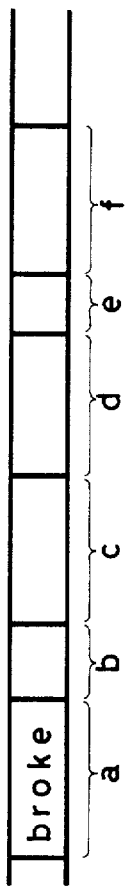
FIG. 2 (1)
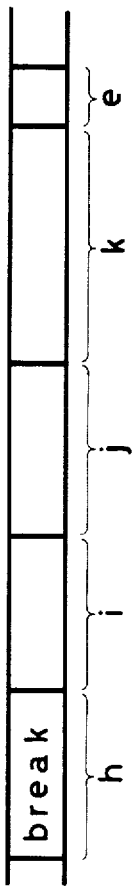
FIG. 2 (2)
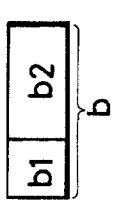
FIG. 2 (3)
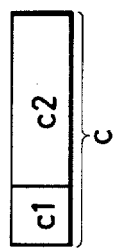
FIG. 2 (4)
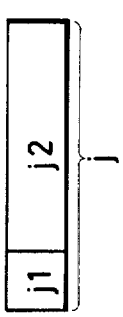
FIG. 2 (5)
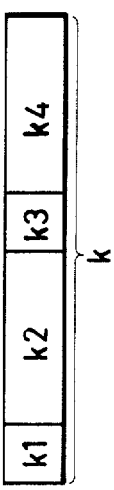
FIG. 2 (6)

FIG. 3(1)  broke  [Jap.Tr.] P. of break [translation] [noninflected form]
                             8e FIG. 3(2)  [noninflected form] break [phrase] [inflection] [noninflected form]
           8b FIG. 3(3)  [Jap.Tr.] ut. コワス, オル [phrase] [inflection] [noninflected form]
           8e FIG. 3(4)  [noninflected form] broke [translation] [noninflected form]
           8b

| a1 | P. of break |
| a2 | a, 14モンナシノ |
| a3 | break |
| a4 | ut. コワス, オル |
| a5 | break broke broken |
| a6 | オシハル |
| a7 | break into |

FIG. 5

"DOG" → RIGHT    FIG. 11(b)

"CAT" → WRONG    FIG. 11(c)

ELECTRONIC TRANSLATOR

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic device called an electronic dictionary and langauge interpreter has been available on the market. The elctronic dictionary and language interpreter differs from conventional electronic devices in that the former is of a unique structure which provides for efficient and rapid retrieval of word information stored in a memory. An example of an electronic dictionary and language interpreter was disclosed in Levy U.S. Pat. No. 4,158,236, June 12, 1979, "electronic dictionary and language interpreter".

Conventional portable language interpreters functioned so that a noninflected word is entered to obtain a translated word equivalent to it. Usually the inflected word is not contained within a memory of the interpreter. Even if the inflected word is stored in the memory and the relation of the inflected word to the noninflected word is stored in the memory, it is difficult to obtain a translation of the noninflected word rapidly. Frequently the inflected word may have another translation word which does not correspond to the noninflected word. Therefore, it was difficult to determine that the inflected word corresponded to a particular noninflected form.

It is desirable for portable language interpreters to generate a translated word equivalent to an inflected word and another translated word equivalent to the noninflected word, in response to the introduction of the noninflected word.

SUMMARY OF THE INVENTION

Accordingly, it is an object of the present invention to provide an improved language interpreter for outputting a noninflected form corresponding to an inflected word, and a translated word equivalent to the noninflected form, in response to the introduction of the inflected word.

It is another object of the present invention to provide an improved electronic translator enabling rapid retrieval of a word stored therein.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic translator is characterized in that a control circuit is provided for providing a translation of a non-inflected form of a word upon entry of an inflected form of the word. In another preferred form of the invention, words are stored in a memory circuit in such a manner that a first memory contains address information referring to a second memory and corresponding to the first letter of each of a group of words. The second memory stores address information related to each of the second letters of the respective words. In a further preferred form of the invention, the memory comprises several memory circuits each of which stores a plurality of words belonging to a common level or rank. The plurality of words of a selected rank are displayed in turn and an operator may attempt to input words equivalent to the displayed words.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 2(1) through 2(6) are schematic representations of first word information storage formats for use in a memory in accordance with the principles of the present invention;

FIGS. 3(1) through 3(4) are examples of display formats according to the principles of the present invention;

FIG. 5 shows schematic representations of additional word information storage formats for use in a memory;

FIG. 9 is a plan view of a further type of electronic portable language interpreter according to the present invention;

FIGS. 11(a) through 11(c) are examples of display formats by the language interpreter of FIG. 9.

DESCRIPTION OF THE INVENTION

Any languages can be applied to the electronic translator of the present invention. An input "source" word is spelled in a specific language to obtain an equivalent word, or a translated word spelled in a different language corresponding thereto. The languages can be freely selected. According to an example of the present invention, it is assumed that the "source" language is English and the translated language is Japanese, and vice versa.

Figure 1:
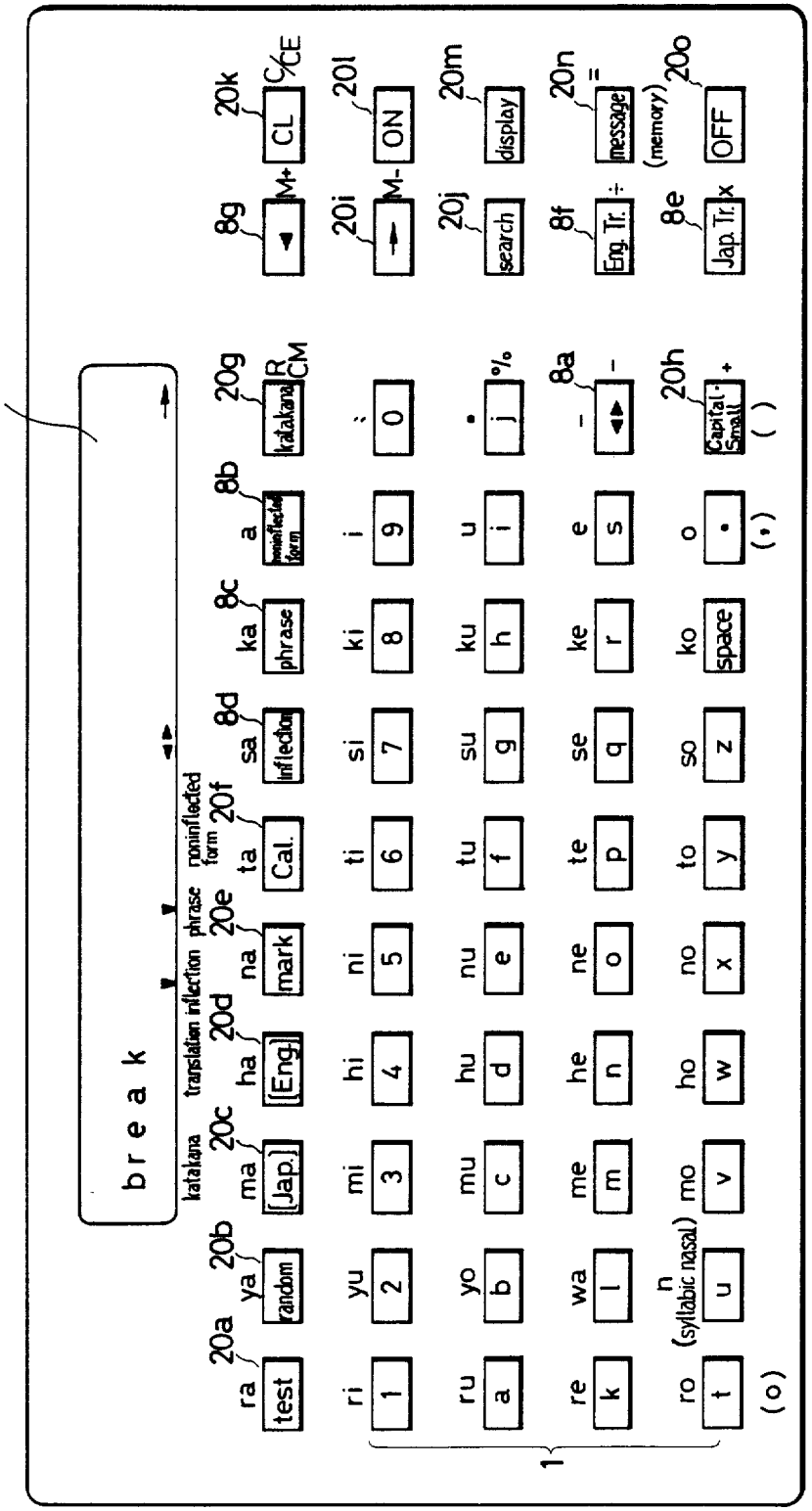
FIG. 1 is a plan view of an electronic portable language interpreter according to the present invention.

Referring now to FIG. 1, there is illustrated a plan view of an electronic translator according to the present invention. The electronic translator comprises a letter keyboard 1, a number of key switches 8a through 8g and 20a through 20o, and a display 18.

More particularly, the letter keyboard 1 includes a plurality of key switches comprising ten digit key switches, Japanese "Katakana" key switches, and English alphabetical key switches.

The plurality of alphabetical key switches are selectively actuated to enter particular English words. A major number of the alphabetical key switches are multi-function and may also be actuated to enter particular Japanese words. This major number of the alphabetical key switches are referred to as Japanese syllabary key switches and are aligned in Japanese alphabetical order. The English alphabetical key switches are also aligned in alphabetical order. Each of the key switches is labeled by respective symbols specifying its function. All of the Japanese syllabary key switches are labeled by the Japanese letters. Besides the Japanese letters, descriptive Roman letters are provided to assist in understanding by foreigners unfamiliar with the Japanese alphabet (Katakana).

The English translation key 8f is operated to translate from a particular Japanese word to an equivalent English word after the particular Japanese word has been introduced. After a particular English word has been entered, the Japanese translation key 8e is operated to perform translation from the particular English word to an equivalent Japanese word. When the "Katakana" key switch 20g is activated, all items subsequently entered by the key switches are represented in Japanese "Katakana" letters rather than English letters. The alphabetical key switches will function in this manner until the key switch 20g is operated again. Without the actuation of the "Katakana" key 20g, the letters entered by the key switches are represented in English.

When the capital/small letter selection key 20h is operated, the next following letter entered by a key switch is introduced as a capital letter in English. When one of the key switches "ya", "yu", "yo" and "tu" of the Japanese "Katakana" key switches is actuated just following the operation of the letter selection key 20h, a small "Katakana" letter is entered.

The calculation key 20f is operated to select a calculation mode whereby the language interpreter functions as an electronic calculator. Once the calculation key 20f is operated, the electronic language interpreter is placed in the electronic calculator mode until key 20f is operated further. In the electronic calculator mode, the key switch 20h functions as a key switch for addition, the key switch 8a is for subtraction, the key switch 8e is for multiplication, the key switch 8f is for division, and the key switch 20n is for the equal function. Further, the key switch "j" is a percent key, 20g is a recall memory and clear memory key, 8g is a memory add key, 20j is a memory subtract key, and 20k=clear/clear entry.

The display key switch 20m is operated to show a particular message in the display 18 used to advertise this electronic language interpreter. An example of such a message is "I help your English/Japanese translations", wherein the contents in the display 18 are sequentially shifting and running digit by digit. This display is repeated until the power supply is stopped, or any other key switch is operated to conduct the translation or the calculation.

Responsive to the actuation of the message key switch 20n, another type of a message is developed and shown in the display 18. This message can be stored by the operator through the actuation of the message key switch 20n just following the actuation of the capital/-small selection key switch 20h after the message containing English or Japanese words is entered by means of the alphabetical or the Japanese "Katakana" key switches. The key switch 20k is actuated to clear English or Japanese words being displayed. In response to the actuation of the key switch 20k, the display becomes empty and then a certain message, for example, "Key in please" is illustrated.

The power-on key 20l and the power-off key 20o are actuated to allow the portable electronic language interpreter to be turned on and off. As soon as the power-on key 20l is actuated, the message entered by the key switch 20n is indicated in the display 18. In the case where no message is stored, the message to be displayed by the actuation of the display key switch 20m replaces the one in connection with the key switch 20n.

The key switch 20i is actuated to make the shifting and running display stop. It is additionally operated so that the display returns to the leading digit of the shifting and running display. The search key switch 20j is actuated to cause retrieval of a word similar in spelling to an entered word in the case where no word equivalent to the entered word is found within the memory.

The mark key switch 20e is operated to mark a particular English or Japanese word. Each time the Japanese mark key switch 20c is operated, a Japanese translated word equivalent to an English word marked by use of the key switch 20e is outputted in the display 18. Each time the English mark key switch 20d is operated, an English word marked by the use of the key switch 20e is outputted in the display 18. The random key switch 20b in combination with the key switch 20c is actuated to develop a plurality of Japanese words stored at random. In connection with the key switch 20d, the key switch 20c is operated to develop a plurality of English words at random.

The test key switch 20a is actuated to test operation of the device. A Japanese translated word, considered to be equivalent to an English word being displayed, is entered in developing the English word marked by the use of the key switch 20d, or in developing a plurality of English words by the use of the key switch 20b. After the Japanese translated word is introduced, the key switch 20a is operated to determine whether the Japanese translated word is equivalent to the English word. By the test operation, whether the words are equivalent is detected so that the alternative is displayed in the display 18.

The key switches 8a, 8b, 8c and 8d are actuated to display a homonym, a noninflected form, a phrase, and an inflected word, respectively. A symbol " ¶ " being displayed is used to show whether data of the noninflected form, the phase and the inflected word are stored or not. When a specific word, say, "break" is introduced, the symbol " ¶ " is displayed adjacent to a label "inflection" near the display 18 when data of the inflected words "break, broke, broken" are stored in the memory. This symbol is illuminated adjacent to a label "phrase" near the display 18 when data of the phrase, say, "break into" and its Japenese translated word are stored in the memory.

After the word "break" is entered, the phrase key switch 8c is operated to show "break into" in the display 18. If two or more phrases are stored, one of them is developed and shown each time the phrase key switch 8c is operated.

The key switch 8b is actuated to provide a noninflected form in response to the introduction of an inflected word to cause retrieval of one or more homonyms of an entered word.

When there is one or more homonyms corresponding to a word entered, a symbol "━ ━" is illuminated in the display 18. The key switch 8g is actuated to bring the display to this condition before the key switches 8c and 8d have been actuated.

FIGS. 2(1) through 2(6) are schematic representations of word information storage formats for use in the memory. FIG. 2(1) shows information related to a word "broke", in which an entry word "broke" is stored in a portion "a", information about the noninflected word is stored in a portion "b", information about the inflected word is stored in portion "C" and a translation of the inflected word in portion "d", information separation is contained within a portion "e", and next entry word is contained within a portion "f".

More particularly, the portion "b" contains an address of the memory in which the noninflected form "break" of the entry word "broke" is stored. The portion "c" contains information that the entry word "broke" is the preterite of the word "break". The portion "d" includes a Japanese translated word equivalent to the adjective word "broke".

The case of an entry word "break" is illustrated in FIG. 2(2). The entry word is stored in a portion "h", a Japanese translated word is in a portion "i", inflected words are within a portion "j", and a phrase is within a portion "k". In particular, the portion "j" stores "break broke broken". The portion "k" stores "break into" and its Japanese translated word.

The case of the information of a noninflected word is shown in FIG. 2(3). A portion "b2" contains coded information indicative of an address of the memory in which the non-inflected word "break" is contained, and a portion "b1" contains coded information representing that the following is address code information.

FIG. 2(4) shows stored condition for a Japanese translated word. A portion "c2" contains information that the entry word "broke" is the preterite of the word "break" and a portion "c1" contains coded information indicating that such information follows.

FIG. 2(5) shows stored condition for an inflected word. A portion "j2" contains a form inflected by the entry word stored in the portion "h", and a portion "j1" contains information indicating that an inflected form follows.

FIG. 2(6) shows storage condition for a phrase. A portion "k4" contains a phrase including the entry word included within the portion "h". A portion "k3" contains information representing that a phrase follows. A portion "k2" contains information of a Japanese translated word equivalent to the phrase stored in the portion "k4". A portion "k1" contains information that a translated Japanese word follows.

The detection of each of the separation codes as stored in the portion "e", "b1", "c2", "j1", "k3", and "k1" enables operation of the electronic translator.

FIGS. 3(1) through 3(4) are examples of display formats responsive to the actuation of the key switch. A word "broke" is assumed to be entered to obtain a translated Japanese word. As soon as the Japanese translation key 8e is operated, a display of "P. of break" is enabled representing that the word "broke" is the preterite of a word "break". This display is based on the information contained within the portion "c2" of FIG. 2(4). Since a translated Japanese word and a noninflected word are stored in the portions "d" and "b" as described with FIG. 2(1), respectively, the symbol " ʃ " is illustrated adjacent the labels "translation" and "noninflected form" both near to the display 18 as indicated in FIG. 3(1).

In accordance with the actuation of the key switch 8b, the noninflected form "break" is displayed as shown in FIG. 3(2).

Its Japanese translation is developed in accordance with the actuation of the key switch 8e as shown in FIG. 3(3). In such a case, the operation of the inflected form key switch 8d enables the development and display of "break broke broken" since the information pertinent to the phrase and the inflected form is stored as described with FIG. 2(2). The phrase key switch 8c is operated to develop "break into" which is contained within the portion "k4" of FIG. 2(6). The Japanese translated word equivalent the phrase is developed in response to the actuation of the Japanese translation key switch 8e.

When the noninflected form key switch 8b is further operated, the inflected word "broke" is displayed as shown in FIG. 3(4) which word was originally introduced by means of the key switches. As the word "broke" functions as an adjective, the Japanese translation key switch 8e is depressed to develop a Japanese translated word as the adjective, under the condition as indicated in FIG. 3(4).

Figure 4:
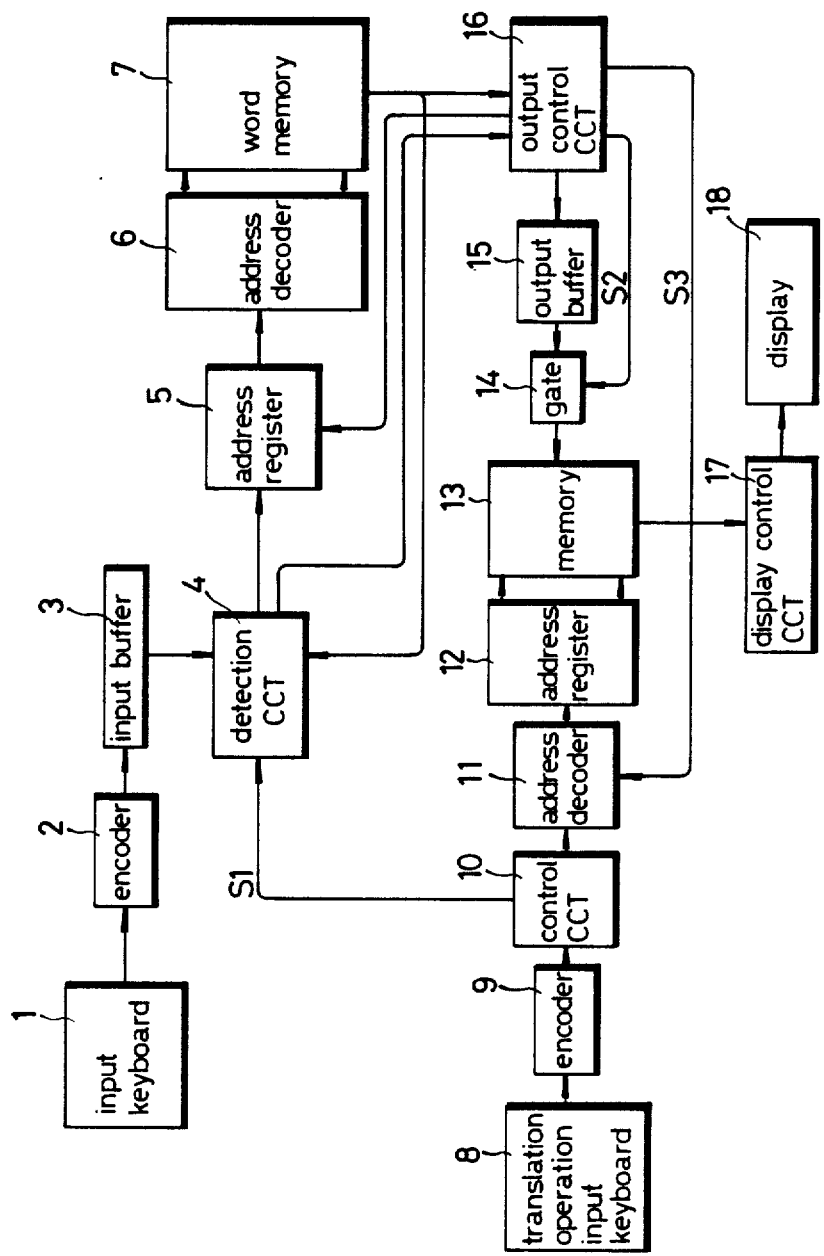
FIG. 4 is a block diagram of a circuit incorporated within the language interpreter of FIG. 1.

FIG. 4 represents a circuit configuration of a circuit implemented within the electronic translator. The circuit comprises an input keyboard 1 equivalent to the alphabetical key switches of FIG. 1, an encoder 2, an input buffer 3, a detection circuit 4, an address register 5, an address decoder 6, a word memory 7, a translation operation input keyboard 8 comprising the translation control key switches as described with reference to FIG. 1, an encoder 9, a control circuit 10, an address decoder 11, an address register 12, a memory 13, a gate 14, an output buffer 15, an output control circuit 16, a display control circuit 17, and the display 18 also shown in FIG. 1.

Operation of the circuit is described with the assumption that the inflected word "broke" is entered by means of the input keyboard 1. Coded information of the word "broke" is applied to the input buffer 3 by means of the encoder 2. Under the circumstances, operation of the Japanese translation key switch 8e within the translation operation input keyboard 8 follows. The control circuit 10 provides signals S1 entering the detection circuit 4. The control circuit 10 is provided for addressing the memory 13. The signals S1 initiate the retrieval operation.

The word memory 7 stores a plurality of English words, Japanese words, and the separation codes as described with FIGS. 2(1) through 2(6). The detection circuit 4 is provided for determining equivalency between the word entered and words sequentially developed by the word memory 7. When equivalency is not obtained, the address of the address register 5 progresses by one, wherein a next word is generated by the word memory 7 for comparing purposes. This operation is repeated until the equivalency is detected. When the equivalency is detected, the detection circuit 4 develops signals applied to the output control circuit 16.

The circuit 16 provides the information as described with reference to FIG. 2(1) toward the memory 13. The address for the word memory 7 is increased. The circuit 16 is responsive to the word memory 7 for loading the information developed by the word memory 7 into the output buffer 15, the information being pertinent to the word "broke". When the circuit 16 detects the separation codes which are described with reference to FIGS. 2(1) through 2(6), the output control circuit 16 provides signals S2 applied to the gate 14. The gate 14 is thereby made conductive so that the contents of the output buffer 15, e.g., the translated word equivalent to the word "broke", are transferred to the memory 13.

At the same time, the circuit 16 develops signals S3, in response to the separation codes. The signals S3 are used to define an address of the memory 13 in which the translated word is stored. A certain address of the memory 13 is adapted to store a certain kind of word.

When the circuit 16 detects the code stored in the portion "b1" of FIG. 2(3), it develops the address code contained within the portion "b2" of FIG. 2(3) and provides it to the address register 5. The noninflected word "break" is developed by the word memory 7 and then introduced into the memory 13.

FIG. 5 shows parts of schematic representations of word storage formats within the memory 13. An address "a1" stores "P. of break", an address "a2" stores a Japanese translated word equivalent to the word "broke" as an adjective. An address "a3" contains the noninflected form corresponding to the inflected word "broke". An address "a4" includes a Japanese translated word equivalent to the noninflected word "break". An address "a5" contains the inflected forms derived from the noninflected word "break". An address "a7" contains a phrase inclusive of the word "break". An address "a6" contains a Japanese translated word corresponding to the phase.

The control circuit 10 is provided for selecting an address for the memory 13. In response to the operation of the translation operation input keyboard 8, the circuit 10 causes the memory 13 to develop its contents toward the display control circuit 17. The circuit 17 drives the display 18.

When it is desired to indicate the noninflected form corresponding to the word "broke", the key switch 8b is operated to show the contents of the address "a3" in the display 18. After they are displayed, the Japanese translation key 8e is operated to show the contents of the address "a4". The inflection key switch 8d is related to the contents of "a5". The phrase key switch 8c is associated with that of "a7". If, while the phrase is indicated, the Japanese translation key 8e is operated, the Japanese translated word contained within the address "a6" is displayed.

Attention is now directed to another preferred form of the present invention. A purpose of this form of the present invention is to provide an improved portable translator comprising an improved word storage device wherein a great number of words can be stored in a compressed form in order to memorize as large a number of words as possible when loading into the memory, while assuring a short retrieval period.

Figure 6:
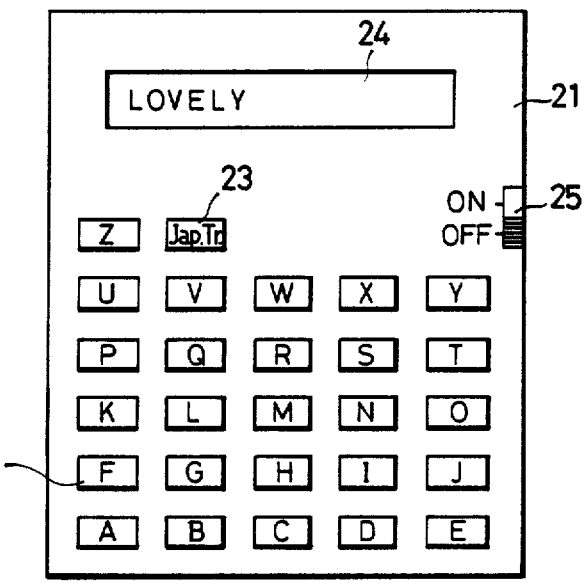
FIG. 6 is a plan view of another type of electronic portable language interpreter according to the present invention.

Referring now to FIG. 6, there is illustrated a plan view of another type of electronic translator according to the present invention. The translator comprises a body 21, a plurality of alphabetical key switches 22, a Japanese translation key switch 23, a display 24, and a power switch 25.

The display 24 is a dot matrix liquid crystal display, for example. A selected English word is entered by the actuation of one or more alphabetical key switches 22. A Japanese translated word is developed in response to the operation of the Japanese translation key switch 23.

Figure 7:
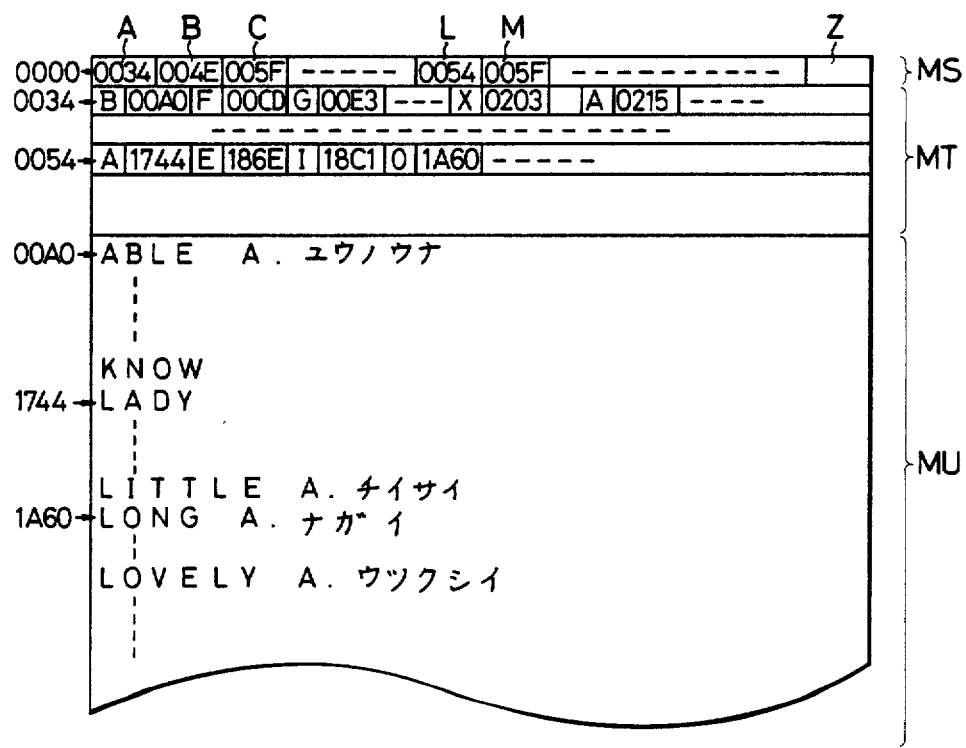
FIG. 7 is a schematic representation of a word information storage format for use in a memory with the interpreter as shown in FIG. 6.
Figure 8:
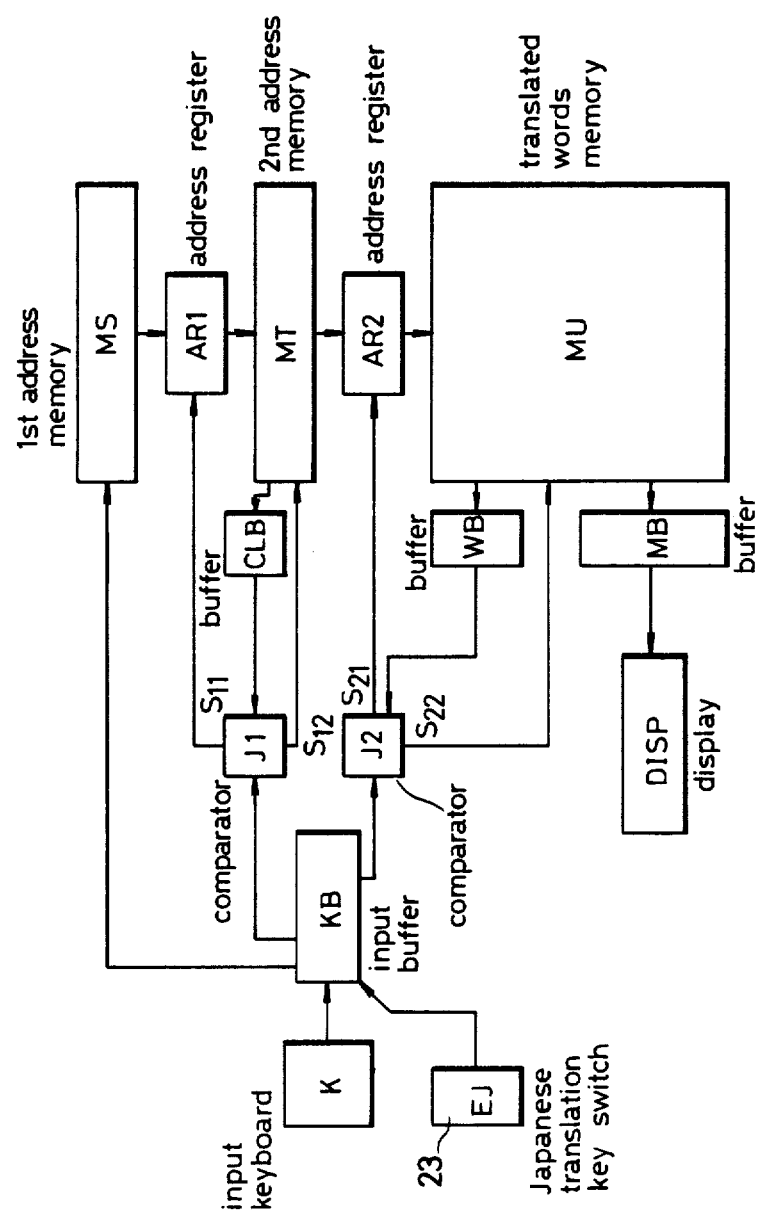
FIG. 8 is a block diagram of a circuit implemented within the interpreter as shown in FIG. 6.

FIG. 7 represents a part of the contents of a memory. FIG. 8 shows a block diagram of a circuit for use with the memory.

With reference to FIG. 7, MU designates a translated word memory for containing a plurality of Japanese translated words in coded information equivalent to English words entered. The memory MU is composed of, e.g., a ROM. A code A within the memory MU represents a part of speech, namely, the adjective.

MT is a memory for containing a plurality of instruction signals used to address the memory MU. The memory MT is also composed of ROM. A particular address of the memory MU is addressed using a corresponding instruction signal developed by the memory MT. A translated word is generated by the memory MU. MS is a memory for containing a plurality of instruction signals applied to address the memory MT.

According to this preferred form of the present invention, a certain instruction signal is delivered by the memory MS. The instruction signal from the memory MS is used to develop another instruction signal from the memory MT. The instruction signal from MT is utilized to generate a translated word from the memory MU.

In particular, MS stores a plurality of head addresses for blocks of information stored in MT. The head addresses are separated from each other according to each head letter of the words stored in MU. Each letter is composed of 2 bytes (16 bits). MT contains a plurality of letter codes (1 byte) pertinent to the second letter of each address of MU and a head address (2 bytes) for each address of MT. MS and MT function as a retieval table used to address MU. Sections of MS can be called small blocks, and sections of MT can be called large blocks.

A particular word, say, "LOVELY" is introduced by means of the alphabetical key switches 22. The Japanese translation key 23 is actuated. Under the circumstances, the first letter "L" of the word "LOVELY" selects a portion containing an address of "0054" of MS corresponding to letter "L". The address "0054" is used to specify a block within MT, the block having address codes related to all letters. Corresponding to the second letter "O" of the word, a portion indicating an address of "1A60" is selected within the selected block of MT. The address of "1A60" is then selected within MU. This is relatively close to the location of the input word "LOVELY" in MU so that a translated word equivalent to the word "LOVELY" is developed from MU relatively quickly. In FIG. 7, address codes "A" through "F" indicate 10 through 15 of the decimal, respectively.

According to the above described storage principle, a memory capacity of about 600 bytes is sufficient without undesirable extension of the retieval time period. An average retrieval time is equal to or less than 0.5 seconds. Required capacity of the memory becomes about one half or one third of a conventional type.

With reference to FIG. 8, the circuit comprises an input keyboard K equivalent to the alphabetical key switches 22 of FIG. 6, the Japanese translation key switch EJ equivalent to switch 23 of FIG. 6, the display DISP equivalent to display 24 of FIG. 6, an input buffer KB, the memories MS, MT, and MU, two address registers AR1 and AR2, three buffers CLB, WB and MB and two comparators J1 and J2.

AR1 is an address register for MT. The comparator J1 is provided for comparing the contents of KB and CLB. CLB temporarily contains the second letter of the word entered. WB stores the third letter and the following letters of the word entered. J2 compares the contents of KB and WB. AR2 is an address register for MU. MB temporarily contains a translated word developed by MU. Operation of the circuit is described with reference to the case that the word "LOVELY" is entered to obtain a translated word.

The word is introduced by means of the input keyboard K. The actuation of the key switch 23 follows. The input buffer KB is adapted to contain character code equivalent to the word. Corresponding to the first letter "L" of the word contained within the input buffer KB, a portion within MS is selected containing an address of "0054" in the manner set forth above. The address of "0054" is applied to AR1. AR1 addresses MT according to this address. Accordingly, letters are selected within MT and compared to the second letter of the input word. One letter, say, "A" is applied to CLB and J1 compares the letter "A" within CLB and the second letter "O" within KB.

As they are not equivalent, J1 develops signals S11 entering to AR1. The address in AR1 is advanced by one. A next letter "E" in the same block specified by "0054" is developed by MT. This letter is applied to CLB. J1 is further actuated to compare the letters "E" and "O". This operation is repeated until the letter "O" is generated by MT. In this example, this letter is assumed to be contained within the fourth section, which is developed at the time when the address of AR1 is improved three times.

When the second letter in KB is the same as the contents of CLB, J1 outputs signals S12 applied to MT, so that MT develops a 2-byte address code of "1A60" just following the letter "O". The address code is introduced to AR2, whereby an address of "1A60" within MU is selected which contains a word "LONG". The word "LONG" is a word heading many words starting with "LO". MU develops the information pertinent to the third letter and the following letters toward WB. J2 is operated to compare the third letter and the following letters within KB and those within WB. When no equivalency is obtained, J2 outputs signals S21 toward AR2. The address of AR2 is improved, accordingly. This operation is repeated until equivalency is detected. When equivalence is detected, J2 provides signals S22 toward MU. Hence, MU develops a translated word equivalent to the word "LOVELY", toward MB. The translated word is sent to DISP, so that it is indicated in DISP.

Figures 9, 11A:
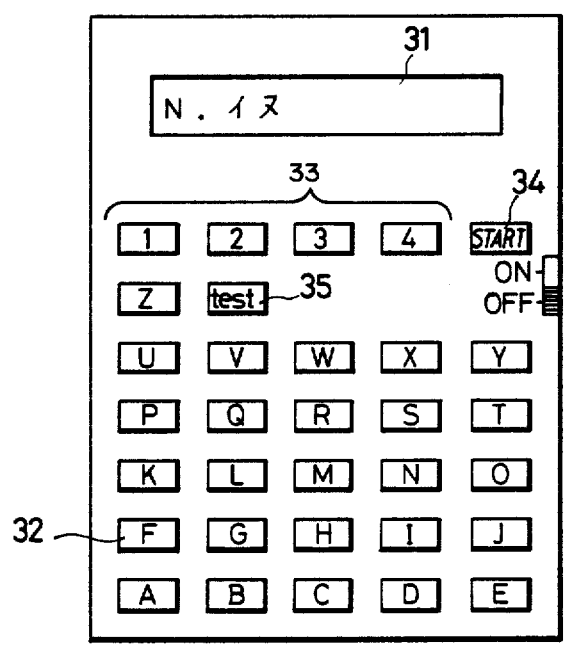

Further attention is directed to a further preferred form of the present invention. With reference to FIG. 9, there is illustrated a plan view of a further type of electronic translator of the present invention.

The translator of FIG. 9 comprises a display 31, alphabetical key switches 32, rank selection keys 33, a start key 34, and a test key 35. The translator of FIG. 9 is operated so that an English words are introduced by means of the alphabetical key switches 32. The translator may be operated as a word learning aid using the rank keys. A rank key, say, "3" is actuated and the start key 34 is operated. A plurality of Japanese words grouped in the rank or level "3" are outputted in turn or at random in the display 31. The operator introduces English words corresponding to the respective Japanese words by means of the alphabetical key switches 32. The test key 35 is further actuated to determine whether they are equivalent or not. If equivalent, a display "RIGHT" is enabled and if not, a display "WRONG" is shown.

Figure 10:
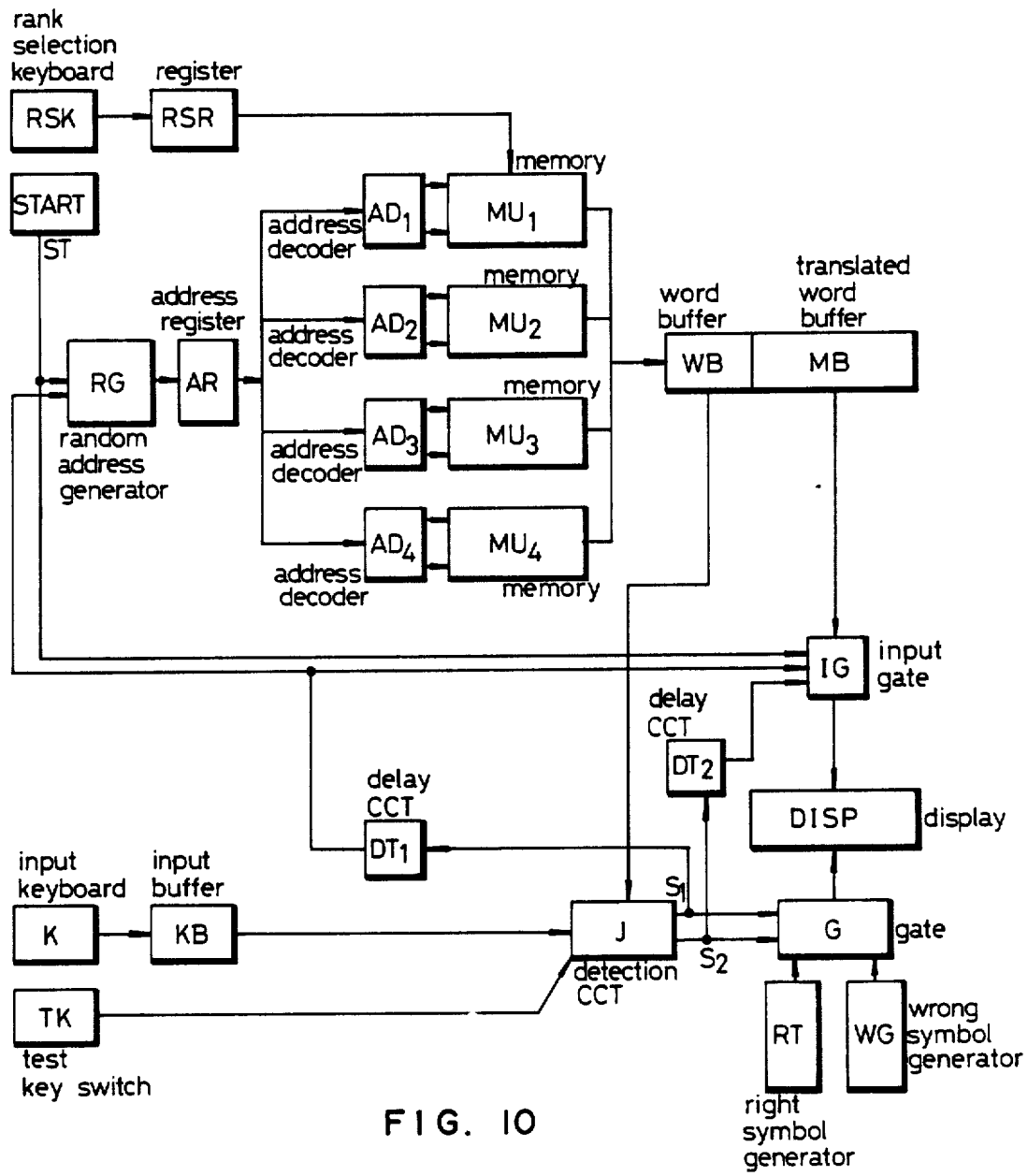
FIG. 10 is a block diagram of a circuit implemented within the interpreter as shown in FIG. 9.

FIG. 10 shows a circuit arrangement of a circuit implemented within the translator of FIG. 9. The circuit comprises a rank (level) selection keyboard RSK equivalent to the rank selection keys 33 of FIG. 9, a start key START equivalent to the start key 34, a register RSR, memories MU1 through MU4 a random address generator RG, an address register AR, address decoders AD1 through AD4, a word buffer WB, a translated word buffer MB, an input gate IG, two delay circuits DT1 and DT2, a detection circuit J, a gate G, a right symbol generator RT, a wrong symbol generator WG, a display DISP equivalent to the same 31 of FIG. 9, an input buffer KB, an input keyboard K equivalent to the alphabetical key switches 32, and a test key switch TK equivalent to the test key 35.

Information entered by the rank selection keyboard RSK is applied to the register RSR. Each of the memories MU1 through MU4 stores a plurality of English words and Japanese translated words within a certain level. One of the memories is selected by the information stored in the register RSR. When the rank "3" is actuated by the actuation of the key 3 of the rank selection keyboard RSK, the memory MU3 is selected. When the start key START is operated, the random address generator RG is energized so that random address information is generated toward the address register AR.

The random address information is applied to each of the memories MU1 to MU4 through each of the address decoders AD1 to AD4. Since one of the memories MU1 through MU4, say, MU3 is selected, only the memory MU3 responds to the address information. The memory MU3 develops an English word and its Japanese translated word in accordance with the address information. The English word is applied to the word buffer WB. The Japanese translated word is admitted to and stored in the buffer MB. Signals ST from the start key START make the input gate IG conductive so that the Japanese translated word within the buffer MB is sent to and indicated in the display DISP.

Under the circumstances, the operator enters an English word considered to be equivalent to the Japanese word being displayed, by means of the input keyboard K. The English word is applied to the input buffer KB. The detection circuit J is energized in response to the actuation of the test key switch TK. The detection circuit is operated to determine whether the contents of the input buffer KB are equivalent to those of the buffer WB or not. When they are equivalent, the detection circuit J provides signals S1. When not, it provides signals S2. The gate G is responsive to the signals S1 or S2 for activating the right symbol generator RT or the wrong symbol generator WG, respectively.

The right symbol generator RT provides a symbol representing that the contents of the input buffer KB are equivalent to those of the buffer WB. The symbol may be "RIGHT", for example. The wrong symbol generator WG provides another symbol indicating that the contents of KB are not equivalent to those of WB. This symbol may be "WRONG", for example. The signals S1 from the detection circuit J are admitted to the input gate IG and the random address generator RG through the delay circuit DT1. After the symbol "RIGHT" is displayed for a while, the next pair of English words and its Japanese translated word are developed by one of the memories, say, memory MU3 under the control of the random address generator RG. The Japanese word is displayed with the control of the input gate IG. The signals S2 from the detection circuit J are admitted to the input gate IG through the delay circuit DT2. After the symbol "WRONG" is displayed for a while, the previous Japanese word is again displayed. Unless a correct English word equivalent to the Japanese word being displayed is entered, the next Japanese word is not displayed.

In place of this type of detection operation, a correct English word may be displayed after some wrong English words have been entered. In this case, a counter means may be further connected to the detection circuit J, the word memory WB and the input gate IG for counting the number of the wrong English words entered. Alternatively, after the symbol "WRONG" is indicated, a correct English word may be subsequently displayed followed by the next Japanese word. For this purpose, suitable means may be further connected to the detection circuit J, the word memory WB, and the input gate IG.

FIGS. 11(a) through 11(c) show display conditions of the display DISP. A Japanese word is displayed as shown in FIG. 11(a). An English word equivalent to the Japanese word of FIG. 11(a) is introduced so that the symbol "RIGHT" is enabled as shown in FIG. 11(b). Another English word, which is not equivalent to the Japanese word of FIG. 11(a), is introduced so that the symbol "WRONG" is enabled as viewed from FIG. 11(c).

While only certain embodiments of the present invention have been described, it will be apparent to those skilled in the art that various changes and modifications may be made therein without departing from the spirit and scope of the invention as claimed.

What is claimed is:

1. An electronic dictionary and language interpreter device wherein a first word represented in a first language is entered to obtain a second word represented in a second language equivalent to the first word, comprising:
input means for entering a first word in said first language;
first memory means for storing a plurality of words in said first language and corresponding words in said second language;
access means responsive to said input means for retrieving said input first word and its corresponding second word, said access means comprising:
second memory means for storing address information associated with letters of the alphabet of said first language and responsive to said input means for outputting first address information associated with the first letter of said input word;
third memory means for storing address information associated with letters of said alphabet;
first address means for receiving said first address information and addressing said third memory means in accordance with said first address information;
means associated with said input means for determining the second letter of said input word, said third memory means being responsive to said determining means for outputting second address information associated with the second letter of said input word; and
second address means for addressing said first memory means in accordance with said second address information;
and display means responsive to said access means for displaying said second word.

* * * * *